United States Patent Office 3,652,486
Patented Mar. 28, 1972

3,652,486
CARVABLE EPOXY RESIN COMPOSITIONS
James Young, East Lansing, Mich., assignor to Ren Plastics, Inc., Lansing, Mich.
No Drawing. Filed Nov. 13, 1968, Ser. No. 775,510
Int. Cl. C08g 51/04, 51/44
U.S. Cl. 260—32.6 R                    18 Claims

ABSTRACT OF THE DISCLOSURE

Epoxy resin compositions are described which contain micro size, hollow glass spheres and a wax-like, lubricous material and which cure to low-density, dimensionally stable solids having low coefficients of thermal expansion and which are carvable and machinable with unusually low wear on cutting tools. The properties of the cured products make them especially useful in the production of models, prototypes, molds, dies and the like.

BACKGROUND OF THE INVENTION

This invention is concerned with curable epoxy resin compositions and the cured solid products which are dimensionally stable, relatively low in density, strong, have high heat distortion temperatures and low coefficients of thermal expansion and, in particular, have excellent machinability and carvability accompanied by only minimal wear of machine cutting and carving tools.

"Machinability" means the ability of the material to be easily planed, shaped, turned or otherwise reduced to specified shape and dimensions with high accuracy by machines having cutting tools. "Carvability" means the ability of the material to be cut or carved in an artistic or decorative manner, including the ability of the material to be easily sculptured delicately.

Epoxy resin compositions have found increasing use as materials of construction for prototypes, molds, dies, fixtures, master patterns and models and the like. These materials are used alone or, often when used in large size applications, are applied over the outer surfaces of other materials of construction. The epoxy resin composition is then cured and the article is then machined, carved or sculptured to the desired configuration and dimensions.

Some of the physical and chemical properties of epoxy resin systems make them useful in such applications. Epoxy resin systems can be formulated so that they can be cast, trowelled in hand lay-up procedures, or sprayed. They can be cured quickly at relatively low temperatures to form cured products having relatively good dimensional stability, toughness, and compressive strength. They have good adhesive strength to most usable substrates.

For use in the applications epoxy resin compositions should be modified to provide cured products which have a low coefficient of thermal expansion, good dimensional stability, high heat distortion temperature, high compressive strength, low density, good adhesive strength, and good machinability and carvability. For use in the large-scale production of intricate, identical models, the cured material should be capable of being machined quickly and accurately by numerical control techniques accompanied by only minimal wear of cutting and carving tools. Materials known in the art meet some but not all of these requirements in varying degrees.

Epoxy resin compositions which cure to produce low density, carvable cured products are known. These contain a curable epoxy resin and phenolic microballoons (micro-size, hollow spheres of phenolic resin). The presence of the phenolic microballoons causes the density of the cured product to be less than the unfilled cured resin. These cured materials have other properties which make them quite suitable as materials of construction for models, patterns, dies, molds, fixtures and the like.

These compositions have several disadvantages. The uncured compositions lack stability on aging. The uncured compositions become more viscous on aging and after aging they cure to produce inferior cured products. It is possible that this is due to the presence of moisture sorbed by the phenolic microballoons, or to the sorption by the microballoons of other components of the compositions, or to the rupture of the microballoons, or to a slow reaction of the microballoons or a component therein with other components in the uncured composition. Any of these factors can influence the aging characteristics and the properties of the cured product. Even the best of such compositions have relatively high coefficients of thermal expansion and relatively low heat distortion temperatures. Certain of the important properties can often be improved by use of different epoxy resins and/or combinations of epoxy resins. However, as will be shown, other important properties then suffer.

It is also known that hollow glass spheres can be used as a filler in epoxy resin compositions. The cured compositions, known as syntactic foams, are much less dense and are more economical than the cured resin alone but yet have relatively good physical properties. The coefficient of thermal expansion of these foams is less than that of unfilled cured resin. However, even though these foams can be sawed and sanded, tool wear is excessive and these foams lack carvability. They cannot be used as satisfactorily as the compositions of this invention in the construction of intricately shaped models, patterns, dies, and fixtures and the like.

When hollow glass spheres are substituted for phenolic microballoons in the carvable compositions known in the art, there is improvement in certain of the properties of the cured products. For example, in two instances when hollow glass spheres were substituted for phenolic microballoons is known compositions, the tensile shear strength and the heat distortion temperature of the cured product were improved and the coefficient of thermal expansion was slightly lower. However, the cured product, as expected, was much less carvable and provoked greater tool wear than the cured products containing the phenolic microballons.

It is and object of this invention to provide novel, curable epoxy resin compositions which can be cured to solid products which have excellent properties as above described. It is an object of this invention to provide curable epoxy resin compositions and the corresponding cured compositions which have all the advantages of those known in the art and which in addition have improved coefficients of thermal expansion and excellent machinability and carvabiltiy accompanied by only minimal wear of cutting and carving tools. These and other objects will become apparent as this invention is further described.

SUMMARY OF THE INVENTION

This invention is the discovery of novel, uncured epoxy resin compositions which can be cured to form hard, dimensionally stable solid products having a low coefficient of thermal expansion, high heat distortion temperature, and excellent machinability and carvability accompanied by only minimal wear of machine and carving tools. The uncured compositions comprise an epoxy resin having an average of more than one epoxy group per average molecular weight, hollow glass spheres and a wax-like, lubricous material. The invention is also the process for producing a carvable solid material which consists essentially of providing a mixture containing a curable epoxy resin which cures to a solid product, hollow glass spheres, and a wax-like, lubricous material and curing the mixture.

DESCRIPTION OF THE INVENTION

A large variety of epoxy resins which cure to form solid products can be used in preparing the compositions of this invention. Epoxy resins (or polyepoxides) are organic compositions which have an average of more than one epoxy group per average molecular weight and which cure to solid products by reaction of the epoxy groups. Many epoxy resins which cure to solid products are well known in the art. Examples of those which can be used are the polyether polyepoxides prepared by reaction of an epihalohydrin or a dihalohydrin with a polyhydric phenol such as 2,2-bis(4-hydroxyphenyl) propane and similar compounds, or polyhydric alcohols such as ethylene glycol, glycerine, hexanetriol, trimethylolpropane, pentaerythritol, polyethylene glycol and the like. Examples of others that can be used are the polyester polyepoxides prepared by reaction of an epihalohydrin or a dihalohydrin with polycarboxylic acids such as, for example, succinic acid, glutaric acid, and the various isomeric phthalic acids. Still other examples are the epoxylated novolacs and polyepoxides derived from the epoxidation of organic compounds containing two or more aliphatic double bonds, including the cycloaliphatic polyepoxides such as, for example, 3,4-epoxycyclohexymethyl-3,4-epoxycyclohexane carboxylate.

The properties of the cured products produced from known epoxy resins are generally similar, but it is well known that certain epoxy resins produce cured products that have better properties than others for certain uses.

Those skilled in the art will understand that some epoxy resins work better than others in the compositions of this invention for specific applications. Of the several classes of epoxy resins previously described, the polyether epoxy resins, the epoxylated novolacs, and the cycloaliphatic polyepoxides are good. This is because they are easily handled and produce epoxy resin compositions which retain their configuration and dimensions well during curing, and the cured products have good dimensional stability over a wide range of temperatures. The epoxy resins which are preferred for use in the compositions of this invention are those derived from bisphenol-A, that is, those produced by reaction of bisphenol-A with epichlorohydrin or dichlorohydrin, the epoxylated novolacs, and 3,4-epoxycyclohexylmethyl-3,4-epoxycyclohexane carboxylate.

Diluents are often included in uncured epoxy resin compositions to modify, generally to lower, the viscosity of the uncured composition and to improve the "wetting" and mixing of other components. The epoxy resin compositions of this invention can contain diluents, preferably reactive diluents. Reactive diluents are preferred because, during cure the reactive diluent reacts and is not in the free state in the cured product as is a non-reactive diluent. Examples of reactive diluents are the relatively low viscosity mono-glycidyl ethers such as phenyl glycidyl ether and aliphatic glycidyl ethers wherein the aliphatic group has one to about ten carbon atoms.

The choice of reactive diluent and the proportion used in the epoxy resin compositions of this invention is within the knowledge of the art and is independent of this invention. The proportion which is used depends on the viscosity of the epoxy resin composition being modified, the viscosity of the relative diluent and its ability to modify the viscosity of the epoxy resin composition, the desired extent of modification, and the desired properties of the cured product. A preferred reactive diluent is butyl glycidyl ether. When the epoxy resin in the composition is an epoxy resin derived from bisphenol-A the proportion of reactive diluent is in the range of zero to about twenty weight percent of the weight of the epoxy resin. When butyl glycidyl ether is used as reactive diluent with an epoxy resin derived from bisphenol-A, it is used in a proportion of from zero up to about 16 percent, preferably about 8–15 percent of the weight of the epoxy resin.

The hollow glass spheres which are used in the compositions of this invention are small, hollow glass spheres having diameters in the range of about 2 to 200 microns. The preferred material is that in which at least about 90 percent of the hollow glass spheres have diameters in the range of about 20 to 80 microns.

The wax-like, lubricous material used in the compositions of this invention has a relatively high melting point, at least about 150° F., preferably at least about 250° F. Lower melting materials produce cured products which tend to lose their shape and dimensions when subjected to relatively high temperatures during use of the cured product. When relatively low-melting materials are used it is believed that the cured products tend to undergo localized melting when machined or carved, at the point of contact of the cutting or carving tool. This is believed to be responsible for the poorer machinability and carvability of compositions which contain relatively low melting materials. The material is substantially non-elastic. Elastic materials form cured products which do not hold their shapes under mechanical stresses and which do not machine well. During machining, grinding and sanding operations, it is believed that an elastic material distorts instead of being neatly severed and removed. The material should be lubricous. This property enhances the machinability and carvability of the cured products and minimizes wear of cutting and grinding tools.

Compositions which meet these requirements are diamides of ethylene diamine and straight chain, aliphatic carboxylic acids having about 14 to 20 carbon atoms. Examples of these are N,N'-bis(hexadecanoyl) ethylenediamine (ethylene bis-palmitamide), N,N'-bis(octadecanoyl) ethylene diamine (ethylene bis-stearamide) and N,N'-bis(eicosanoyl) ethylene diamine (ethylene bis-eicosanamide). The preferred material is N,N'-bis(octadecanoyl) ethylene diamine (ethylene bis-stearamide).

The diamides can be produced by reaction of ethylenediamine with the appropriate aliphatic carboxylic acid or a simple ester of the acid, such as its methyl or ethyl ester, or the acyl halide of the acid, such as its acyl chloride. These types of reactions and procedures are well known.

Even very small proportions of the hollow glass spheres and the wax-like, lubricous material offer improvement, although at extremely tow levels the effect is small. When exceedingly large proportions of these are present in the compositions some of the desirable properties begin to suffer. For example, at extremely high levels the uncured composition is quite dry, less fluid and more difficult to handle and the strength of the cured product begins to suffer. However, by weight, the proportion of hollow glass spheres can be as high as 100 parts and the proportion of the wax-like lubricous material can be as high as 125 parts, per 100 parts of epoxy resin, including any reactive diluent present in the composition. The preferred proportions, by weight, are 5 to 60 parts of hollow glass spheres and 5 to 75 parts of the diamide, per 100 parts of epoxy resin, including any reactive diluent present in the composition.

The curing of the epoxy resin compositions of this invention is within the knowledge of the art. Epoxy resin compositions are cured with the aid of a curing agent. The term "curing agent" is meant to include both catalytic curing agents and polyfunctional crosslinking materials which are commonly referred to as hardeners. Many curing agents are known in the art. These include aliphatic and aromatic amines and polyamines such as ethylene diamine, diethylene triamine, triethylene tetramine, aminoethylpiperazine, diethylaminopropylamine, and benzyldimethylamine, adducts of amines and ethylene oxide, amine-terminated polyamides and various anhydrides such as phthalic acid anhydride, hexahydrophthalic acid anhydride and the like. It is known that some epoxy resins can be cured at room temperature with the aid of certain curing agents and that other combinations require heating.

The choice of curing agent and the proportions in which it is used is within the knowledge of those skilled in the art of epoxy resins. The presence of the hollow glass spheres and the wax-like lubricous material does not materially influence the choice of curing agent and its proportion anymore than in the case of other materials which are used as inert fillers in epoxy resin compositions. The effect of the presence of these materials is observed, regardless of the curing agent which is used, so long as the composition cures to a solid product. The choice of curing agent and its proportion is a function of the epoxy resin used in the composition, the curing conditions desired and the desired properties of the final cured product. This knowledge is in the art.

The modified amines and polyamines such as described in U.S. Pats. 2,901,461 and 2,992,192 are well suited for use as curing agents in the compositions of this invention. The proportion in which these curing agents are used is in the range of about 0.25 to 2.0, preferably 0.5 to 1.75 equivalent of curing agent per epoxy equivalent.

Examples I illustrates the compositions and the method by which the compositions are prepared and cured.

EXAMPLE I

The epoxy resin used in this example is an epoxy resin derived from bisphenol-A and containing about 10 percent by weight of butyl glycidyl ether and having an epoxy equivalent weight of 180±5. The hollow glass spheres are a mixture of spheres, 90 percent of which have diameters in the range of 20 to 80 microns. Fifty parts (by weight) of the epoxy resin, 10 parts of the hollow glass spheres, 20 parts of ethylene bis-stearamide, 7 parts of hydrated alumina and 13 parts of powdered aluminum are blended together.

This epoxy resin composition can be cured with any curing agent commonly known to be useful in curing the epoxy resin which is present. The composition can be cured to a solid product with the addition of about 12.5 parts of a propylene oxide adduct of diethylene triamine such as described in U.S. Pat. 2,901,461. With this curing agent, the composition is suitable as a trowellable material because of its consistency and initially moderate rate of cure at room temperature. The composition cures at room temperature to provide a superior product. This feature makes it especially useful in making a large object which cannot be conveniently heat-treated because of its size. It can be cured more rapidly at elevated temperature. Alternatively, it can be allowed to cure at room temperature and then heat-treated. Heat-treatment promotes further curing; some of the properties of heat-treated product are improved even over the products cured at room temperature. Heat-treated product has even greater dimensional stability and the heat distortion temperature is exceptionally high.

Product from Example I which was cured at room temperature for 7 days had a heat distortion temperature of 137° F. at 66 p.s.i. This is at least equal to similar products. Product cured at 150° F. for 4 hours had a heat distortion temperature of 171° F. at 66 p.s.i. and 163° F. at 264 p.s.i. This is exceptionally high for such materials. The density of the product was 0.89 gram per cubic centimeter, significantly less than the unfilled cured resin. The coefficient of thermal expansion was found to be $2.67 \times 10^{-5}$ in./in./° F. This is much smaller than similar products currently available which have coefficients of $5 \times 10^{-5}$ or greater.

The cured product of Example I has excellent carvability as well as excellent machinability. When carved, the cut portion departs as a shaving as in the case of more carvable woods. This is not common for epoxy resin compositions and it is especially surprising in view of the presence of the glass filler. Even more surprising is that wear of cutting and carving tools was unusually low in spite of the fact that the cured composition contained a cured epoxy resin and glass, both of which are hard materials which ordinarily cause considerable tool wear. Furthermore, the cured product can be readily shaped with a file, and surfaces can be buffed smooth to receive lacquer or other type of finishes.

These and other uncured compositions showed good stability on aging, showing no significant increase in viscosity on aging in sealed containers.

The composition of Example I can be prepared without the hydrated alumina and powdered aluminum. Even in the absence of these materials, the composition cures to a carvable solid product, as illustrated by Example II.

EXAMPLE II

Sixty (60) parts by weight of the epoxy resin described in Example I, 15 parts of the hollow glass spheres described in Example I, and 25 parts of ethylene bis-stearamide are blended together. This composition can be cured to a solid product by the addition of about 14 parts of the curing agent described in Example I.

Product which had cured at room temperature for 24 hours was found to have a coefficient of thermal expansion of $3.25 \times 10^{-5}$ in./in./° F., and a heat distortion temperature of 112° F. at 66 p.s.i. Product cured for 4 hours at 150° F. had a coefficient of $2.86 \times 10^{-5}$ in./in./° F. and heat distortion temperature of 150° F. at 66 p.s.i. The cured product had much improved machinability and carvability and caused much less wear on cutting and carving tools than prior art compositions. The carving properties of the cured product were much like those of the cured product from Example I.

For comparison, Example III illustrates an epoxy resin composition containing the same epoxy resin and hollow glass spheres as used in Examples I and II, the wax-like, lubricous material being omitted.

EXAMPLE III (COMPARATIVE)

A blended mixture of 60 parts (by weight) of the epoxy resin and 40 parts of the hollow glass spheres is prepared. This epoxy resin composition can be cured to a solid product by the addition of about 14 parts of the curing agent described in Example I.

Product from Example III cured for 24 hours at room temperature had a coefficient of thermal expansion of $1.37 \times 10^{-5}$ in./in./° F. and a heat distortion temperature of 118° F. at 66 p.s.i. Product cured for 4 hours at 150° F. had a coefficient of thermal expansion of $1.7 \times 10^{-5}$ in./in./° F. and heat distortion of 160° F. at 66 p.s.i.

Cured product from Example III had good machinability but caused considerable wear on cutting and carving tools. The cured product was not carvable. It crumbled when carved rather than producing a shaving when cut as did the cured compositions from Examples I and II. Generally, its carving properties were very poor.

For comparison, Example IV illustrates a composition similar to that of Example II from which the hollow glass spheres were omitted.

EXAMPLE IV (COMPARATIVE)

Sixty (60) parts (by weight) of the epoxy resin described in Example I and 40 parts of ethylene bis-stearamide are blended together. This composition can be cured to a hard product by the addition of about 14 parts of the curing agent described in the previous examples.

Product from Example IV which had cured for 24 hours at room temperature had a heat distortion temperature of 113° F. at 66 p.s.i. Product cured for 4 hours at 150° F. had a heat distortion temperature of 140° F. at 66 p.s.i. The cured product did not have the strength and machinability associated with the cured products from the previous examples. Its carvability was better than the cured product from Example III, but poorer than the cured products from Examples I and II. Furthermore, lacking the hollow glass spheres, the cured product was much more dense than cured product from Examples I–III.

The foregoing examples and discussion illustrate the surprising discovery that compositions can be prepared which are carvable and machinable and which do not cause great wear of carving and cutting tools and which in addition have other good mechanical properties. As expected and known, compositions containing the hollow glass spheres and from which the wax-like, lubricous material is omitted have poor carving properties and cause considerable wear of cutting and carving tools. Surprisingly, compositions containing the hollow glass spheres and the wax-like, lubricous material are both machinable and carvable, and do not cause great wear of carving and cutting tools. Also surprisingly, these compositions have other good properties.

The epoxy resin used in Examples I, II and III is known to cure to solid product having a relatively high heat distortion temperature and is known to bond exceptionally well to glass. The invention can be practiced with combinations of other epoxy resins and other curing agents.

Commercial compositions containing phenolic Microballoons which do not contain a wax-like lubricous material and which cure to carvable compositions were altered and the properties of the resulting compositions were studied and compared. For example, the specific epoxy resin used in Example I, known to have a high heat distortion temperature, was substituted for the epoxy resin in a commercial composition. The cured product, as expected, had a high heat distortion temperature, 180° F., as compared with about 130–135° F. for the commercial product. It had a lower coefficient of thermal expansion, $2.3 \times 10^{-5}$ in./in./° F. as compared with about $5 \times 10^{-5}$ for the commercial product. However, the cured product was much less carvable and machinable than the commercial product. The cured product crumbled when carved and produced no shaving. Furthermore, it caused considerable wear on carving and machine cutting tools. The composition was not very useful as a carvable material. Although substitution of the epoxy resin improved certain properties, other important properties suffered.

Hollow glass spheres were substituted for phenolic Microballoons in two commercial compositions. In one instance, the coefficient of the thermal expansion, $3.5 \times 10^{-5}$ in./in./° F. was improved. In the other instance the coefficient, $6.4 \times 10^{-5}$ in./in.° F. was higher than the commercial product. Heat distortion temperatures of the cured products were only slightly higher than the commercial compositions. Carvability of the cured products was about the same as for the commercial compositions. Wear of carving and machine cutting tools was slightly greater than in the commercial compositions. Substitution of hollow glass spheres for phenolic Microballoons did not improve any of the important properties significantly. In fact, in the one instance the coefficient of thermal expansion suffered.

The wax-like, lubricous material used in Example I was substituted for the phenolic microballoons in two commercial compositions. The coefficients of thermal expansion of the curved products, $6.4 \times 10^{-5}$ and $6.1 \times 10^{-5}$ in./in./° F., were higher than for the cured commercial products. Heat distortion temperatures were not higher than for the cured commercial products. The cured products had only fair to good carvability; a shaving could be carved. Again, some properties were equal to or improved over the commercial products as a result of the substitution, but other important properties suffered by the substitution. It is apparent that the wax-like, lubricous material does not, by itself, contribute to the high heat distortion temperatures found for the invented compositions.

In view of the results obtained in attempting to modify and improve the prior art compositions, it was surprising to find that the compositions of this invention cure to form products having properties which make them especially useful as carvable materials. All of the important properties of the cured compositions which make these compositions useful as carvable materials are especially good. The heat distortion temperature is high. The coefficient of thermal expansion is considerably lower. The tensile shear strength and compressive strength are very good. They are exceptionally carvable and machinable and produce much less wear on carving and machine cutting tools. Furthermore, they have good dimensional stability over a wide temperature range.

The foregoing description of this invention will suggest variations and modifications to those skilled in the art. The scope of the invention is limited only as in the following claims.

I claim:
1. A composition of matter comprising in admixture:
   (a) an epoxy resin which is capable of being cured to produce a solid product,
   (b) 5 to 100 parts by weight, per 100 parts of epoxy resin, of hollow glass spheres having diameters in the range of about 2 to 200 microns, and
   (c) 5 to 125 parts by weight, per 100 parts of epoxy resin, of a diamide of ethylenediamine and a straight chain, aliphatic carboxylic acid having 14 to 20 carbon atoms.
2. The composition of claim 1 wherein the diamide is N,N'-bis(octadecanoyl)ethylenediamine.
3. The composition of claim 1 wherein the epoxy resin is an epoxy resin derived from bisphenol-A.
4. The composition of claim 1 wherein the epoxy resin is an epoxylated novolac resin.
5. The composition of claim 1 wherein the epoxy resin is a cycloaliphatic epoxy resin.
6. The composition of claim 1 wherein the curable epoxy resin is an epoxy resin derived from bisphenol-A, the diamide is N,N'-bis(octadecanoyl)ethylenediamine, the proportion by weight of hollow glass spheres is in the range of 5 to 60 parts per 100 parts of epoxy resin and the proportion by weight of diamide is 5 to 75 parts per 100 parts of epoxy resin.
7. The process for producing a carvable solid material which consists essentially of:
   (a) providing a mixture comprising:
      (i) an epoxy resin which is capable of being cured to produce a solid product,
      (ii) 5 to 100 parts by weight, per 100 parts of epoxy resin, of hollow glass spheres having diameters in the range of about 2 to 200 microns and
      (iii) 5 to 125 parts by weight, per 100 parts of epoxy resin, of a diamide of ethylenediamine and a straight chain, aliphatic carboxylic acid having 14 to 20 carbon atoms, and
   (b) curing the mixture to form a solid product.
8. The process of claim 7 wherein the epoxy resin is an epoxylated novolac resin.
9. The process of claim 7 wherein the epoxy resin is a cycloaliphatic epoxy resin.
10. The process of claim 7 wherein the epoxy resin is an epoxy resin derived from bisphenol-A.
11. The process of claim 7 wherein the diamide is N,N'-bis(octadecanoyl)ethylenediamine.
12. The process of claim 7 wherein the epoxy resin is an epoxy resin derived from bisphenol A and the diamide is N,N'-bis(octadecanoyl)ethylenediamine, the proportion of hollow glass spheres is in the range of 5 to 60 parts by weight and the proportion of diamide is in the range of 5 to 75 parts, per 100 parts of epoxy resin.
13. A carvable solid material resulting from the curing of a mixture comprising an epoxy resin which is capable of being cured to produce a solid product, between 5 to 100 parts by weight, per 100 parts of epoxy resin, of hollow glass spheres having diameters in the range of about 2 to 200 microns, and between 5 to 125 parts by weight, per 100 parts of epoxy resin, of a diamide of ethylenediamine and a straight chain aliphatic carboxylic acid having 14 to 20 carbon atoms.
14. The carvable solid material of claim 13 wherein the diamide is N,N'-bis(octadecanoyl)ethylenediamine.

15. The carvable solid material of claim 13 wherein the epoxy resin is an epoxy resin derived from bisphenol A.

16. The carvable solid material of claim 13 wherein the epoxy resin is an epoxylated novolac resin.

17. The carvable solid material of claim 13 wherein the epoxy resin is a cycloaliphatic epoxy resin.

18. The carvable solid material of claim 13 wherein the epoxy resin is an epoxy resin derived from bisphenol A and the diamide is N,N'-bis(octadecanoyl)ethylenediamine and the proportion of hollow glass spheres is in the range of 5 to 60 parts by weight and the proportion of diamide is in the range of 5 to 75 parts by weight, per 100 parts of epoxy resin.

References Cited
UNITED STATES PATENTS

| | | | |
|---|---|---|---|
| 2,464,855 | 3/1949 | Duggan et al. | 260—32.6 |
| 3,025,249 | 3/1962 | Chen | 260—37 EP X |
| 3,236,929 | 2/1966 | Jupa et al. | 260—32.6 X |
| 3,274,144 | 9/1966 | Keskkula et al. | 260—32.6 |
| 3,288,618 | 11/1966 | DeVries | 260—37 EP |
| 2,806,509 | 9/1957 | Bozzacco et al. | 260—37 EP UX |

LEWIS T. JACOBS, Primary Examiner

U.S. Cl. X.R.

260—37 EP